United States Patent [19]

Winkowski

[11] 4,442,151

[45] Apr. 10, 1984

[54] WOOD PLANK WALLCOVERING SYSTEM USING WIDTHS OF 3 TO 8 INCHES

[75] Inventor: Daniel A. Winkowski, Tonawanda, N.Y.

[73] Assignee: National Gypsum Company, Dallas, Tex.

[21] Appl. No.: 327,242

[22] Filed: Dec. 3, 1981

[51] Int. Cl.³ ................................................ B32B 3/10

[52] U.S. Cl. ..................................... 428/54; 156/297; 156/299; 428/55; 428/56; 428/151; 428/211; 428/904.4

[58] Field of Search ..................... 428/54, 55, 56, 151, 428/904.4, 346, 211; 156/297, 299

[56] References Cited

U.S. PATENT DOCUMENTS

| | | | |
|---|---|---|---|
| 71,367 | 11/1867 | Davis | 156/71 |
| 2,100,175 | 11/1937 | Tomec | 428/151 |

*Primary Examiner*—Marion McCamish
*Attorney, Agent, or Firm*—Robert F. Hause

[57] ABSTRACT

A plurality of rolls of wallcovering having a wood grain design in a plurality of different widths which, in strips, is applied on a wall over previously applied adhesive, which preferably is pigmented to a relatively dark color.

10 Claims, 1 Drawing Figure

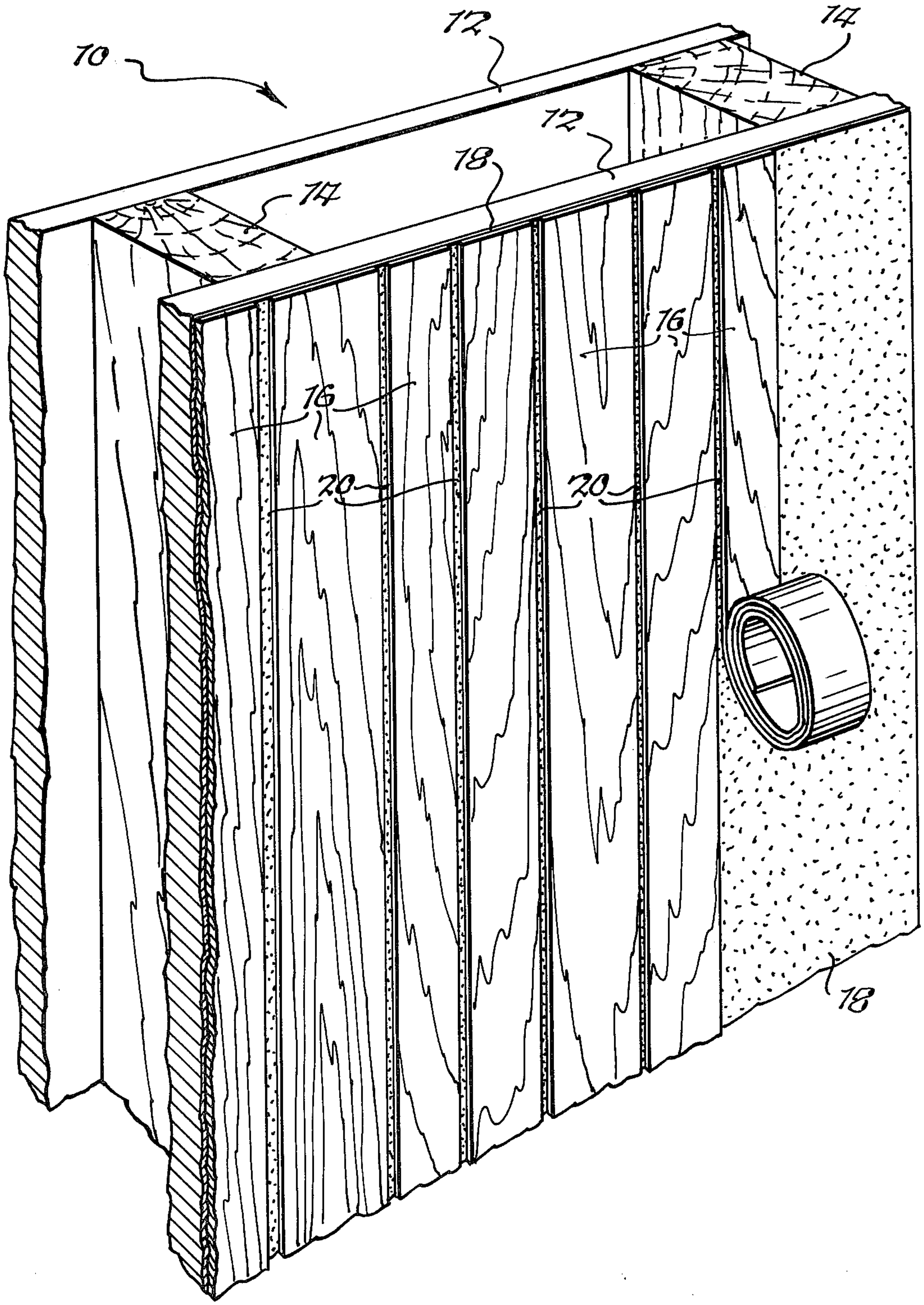
10
12
12
14
14
18
16
16
20
20
18

WOOD PLANK WALLCOVERING SYSTEM USING WIDTHS OF 3 TO 8 INCHES

This invention relates to a wallcovering system, and particularly to a combination of wood grained wallcovering strips and an adhesive, and to the method of making a simulated wood plank wall.

Simulated wood plank walls are very popular and products are available for producing them. A simulated wood plank wall can be made by using predecorated 4'×8' plywood panels. Another method would be to hang 4' wide predecorated wallcovering, abutting adjacent strips tightly together along each joint.

The present invention employs relatively narrow strips of wallcovering, which are provided in a plurality of narrow widths, and which may be applied by a professional or a do-it-yourselfer. In the preferred form, the strips have a wood grain pattern and are spaced apart leaving a pigmented adhesive show through at the spaced joints.

It is an object of the invention to provide a novel form of wallcovering.

It is a further object to provide a novel simulated wood plank wall.

These and other objects and advantages will be more readily apparent when considered in relation to the preferred embodiments as set forth in the specification and shown in the drawing which is an isometric view of a section of wall with simulated wood planking strips applied thereon in accordance with the invention.

Referring to the drawing, there is shown a wall 10 in which wallboards 12, 12 are affixed to studs 14, 14. On the face of wall 10 shown, there is adhesively applied narrow wallcovering strips 16, 16. Strips 16, 16 are held to the wallboard by a pigmented adhesive layer 18, which in the finished wall is exposed in the narrow grooves 20, 20, formed between adjacent strips 16, 16, by the slight spacing apart of the strips 16, 16.

In the preferred form of the invention, the strips 16, 16 vary, one from another, with widths ranging from about three inches to about eight inches. The strips 16, 16 preferably have a design on the face which may simulate a wood grain. As will be seen in the drawing, the designs on respective strips are all generally similar, but not necessarily identical. The spacing between the strips is preferably in the range of about $\frac{1}{8}$ inch to $\frac{1}{2}$ inch.

The strips 16, 16 may be a single ply or a plurality of laminated plies. In the preferred form the strips 16, 16 consist of a relatively thick paperboard of about 0.020 inch thickness and a relatively thin decorated veneer ply of about 0.001 inch. Very fine veneer plies of about 0.001 inch thickness wood grain gravure printed paper are available in the United States, made in Japan by Dai Nippon Printing Co. or by Toppan Printing Company.

In the preferred form of the invention, the adhesive layer 18 is a combination of a dark pigment, such as carbon black, mixed with an adhesive, such as a polyvinyl acetate, polyvinyl alcohol or an acrylic, formulated to provide a few minutes of tack time, after being applied to the wall, during which the strips 16, 16 may be applied. It is contemplated that the strips 16, 16 would be marketed in rolls, the rolls being of various widths, which rolled material can then be applied over the adhesive, forming strips of random varying widths on a single wall, as shown in the drawing. The material from which strips 16, 16 are made must thus be flexible enough to be rolled up and unrolled.

The adhesive layer 18 may be applied over the wall with a roller or a brush. The strips 16, 16 may be pressed firmly against the adhesive layer using a broad knife.

The strips 16, 16, as manufactured, may also include a thin clear protective coating, such as polyvinyl chloride, acrylic, melamine, lacquer or an extruded coating of polyethylene.

The invention is particularly advantageous to the common do-it-yourselfer in that the materials to be purchased are easily brought home in a shopping bag. The adhesive may easily be applied using a paint roller. The narrow strips are very easy to handle and align, as compared to the common wider wallcoverings or decorated wood panels.

Having completed a detailed description of the preferred embodiments of my invention so that those skilled in the art may practice the same, I contemplate that variations may be made without departing from the essence of the invention.

I claim:

1. A wallcovering combination for covering a single wall comprising a plurality of strips of wallcovering in a form which prior to being adhered to a wall is suitable for being adhered to a wall, of sufficient flexibility prior to being adhered to a wall to be rolled up and unrolled, all having a generally similar design, having a plurality of various widths, all said widths being in the range of from about 3 inches to about 8 inches and an adhesive for adhering the strips to a wall in a random width, parallel relationship one to another.

2. A wallcovering combination as defined in claim 1 wherein said strips of wallcovering have a wood grain pattern, whereby a random wood plank effect is produced.

3. A wallcovering combination as defined in claim 2 wherein said adhesive is adapted to cover wide areas of wall, and provides improved aesthetics when said strips are positioned in a spaced apart parallel relationship.

4. A decorated wall comprising a flat surface and adhered thereto a wallcovering combination as defined in claim 1.

5. A decorated wall as defined in claim 4 wherein said strips of wallcovering have a wood grain pattern, with various widths randomly arranged, whereby a random wood plank effect is produced.

6. A decorated wall as defined in claim 4 wherein said adhesive is in a layer extending throughout said wall, and said strips are adhered thereover with narrow spaces therebetween exposing narrow strips of the adhesive layer therethrough.

7. A decorated wall as defined in claim 6 wherein said adhesive contains a uniformly distributed relatively dark pigment therein.

8. The method of applying a wallcovering comprising the steps of applying a layer of adhesive throughout an area of wall to be covered with wallcovering strips, and applying over said adhesive a plurality of strips of wallcovering, of sufficient flexibility prior to being adhered to said wall to be rolled up and unrolled, all having a generally similar design, having a plurality of various widths, all said widths being in the range of from about 3 inches to about 8 inches, arranging said strips in parallel, random width relationship to one another.

9. In the method of claim 8, the step of applying an adhesive having mixed therein a pigment, and the step of spacing said strips of wallcovering apart, thereby exposing narrow strips of pigmented adhesive therebetween.

10. In the method of claim 9, the step of applying strips of wallcovering which have a wood grain pattern, thereby producing a simulated random wood plank wall.

* * * * *